United States Patent
Rodriguez Lopez et al.

(10) Patent No.: US 11,961,287 B2
(45) Date of Patent: Apr. 16, 2024

(54) METHOD AND SYSTEM FOR MEANINGFUL COUNTERFACTUAL EXPLANATIONS

(71) Applicant: ServiceNow Canada Inc., Toronto (CA)

(72) Inventors: Pau Rodriguez Lopez, Toronto (CA); Massimo Caccia, Toronto (CA); Lee Zamparo, Toronto (CA); Issam Laradji, Toronto (CA); Alexandre Lacoste, Toronto (CA); David Vazquez Bermudez, Toronto (CA)

(73) Assignee: SERVICENOW CANADA INC., Montreal (CA)

( * ) Notice: Subject to any disclaimer, the term of this patent is extended or adjusted under 35 U.S.C. 154(b) by 222 days.

(21) Appl. No.: 17/449,872

(22) Filed: Oct. 4, 2021

(65) Prior Publication Data
US 2022/0130143 A1 Apr. 28, 2022

Related U.S. Application Data

(60) Provisional application No. 63/086,842, filed on Oct. 2, 2020.

(51) Int. Cl.
*G06V 10/98* (2022.01)
*G06T 5/50* (2006.01)
(Continued)

(52) U.S. Cl.
CPC ............... *G06V 10/98* (2022.01); *G06T 5/50* (2013.01); *G06V 10/454* (2022.01); *G06V 10/473* (2022.01); *G06V 10/82* (2022.01)

(58) Field of Classification Search
CPC .... G06V 10/98; G06V 10/454; G06V 10/473; G06V 10/82; G06V 10/764; G06V 10/776; G06T 5/50
See application file for complete search history.

(56) References Cited

U.S. PATENT DOCUMENTS 10,665,011 B1 *  5/2020  Sunkavalli .............. G06N 3/084
10,922,788 B1 *  2/2021  Yu .......................... G06V 10/774
(Continued)

*Primary Examiner* — Xuemei G Chen
(74) *Attorney, Agent, or Firm* — Fasken Martineau DuMoulin, LLP

(57) ABSTRACT

A computer-implemented method for explaining an image classifier, the method comprising: receiving an initial image, the initial image having been wrongly classified by the image classifier; receiving an initial gradient of a function executed by the image classifier generated while classifying the initial image, the function being indicative of a probability for the initial image to belong to an initial class; converting the initial image into a latent vector, the latent vector being a representation of the initial image in a latent space; generating a plurality of perturbation vectors using the initial gradient of the function executed by the image classifier; combining the latent vector with each one of the plurality of perturbation vectors, thereby obtaining a plurality of modified vectors; for each one of the plurality of modified vectors, reconstructing a respective image, thereby obtaining a plurality of reconstructed images; transmitting the reconstructed images to the image classifier; for each one of the plurality of reconstructed images, receiving a respective updated gradient of the function executed by the image classifier; using the respective updated gradients, determining amongst the reconstructed images at least one given reconstructed image for which the respective updated gradient is indicative that a new class different from the initial class has been assigned by the image classifier; and outputting the at least one given reconstructed image.

15 Claims, 10 Drawing Sheets

(51) Int. Cl.
*G06V 10/44* (2022.01)
*G06V 10/46* (2022.01)
*G06V 10/82* (2022.01)

(56) References Cited

U.S. PATENT DOCUMENTS

| | | | |
|---|---|---|---|
| 10,937,237 B1* | 3/2021 | Kim | G06T 7/75 |
| 2019/0045317 A1* | 2/2019 | Badhwar | H04S 7/302 |
| 2019/0050727 A1* | 2/2019 | Anderson | G06N 3/08 |
| 2019/0102678 A1* | 4/2019 | Chang | G06F 17/18 |
| 2020/0110982 A1* | 4/2020 | Gou | G06N 3/088 |
| 2020/0180647 A1* | 6/2020 | Anthony | B60W 60/0015 |
| 2020/0184316 A1* | 6/2020 | Kavukcuoglu | H03M 7/3082 |
| 2020/0202622 A1* | 6/2020 | Gallo | G06T 15/10 |
| 2020/0372308 A1* | 11/2020 | Anirudh | G06N 3/088 |
| 2021/0182950 A1* | 6/2021 | Makkapati | G06F 18/214 |
| 2021/0264207 A1* | 8/2021 | Smith | G06V 10/44 |
| 2021/0264234 A1* | 8/2021 | Paris | G06N 3/045 |
| 2021/0264235 A1* | 8/2021 | Zhang | G06N 3/045 |
| 2021/0271867 A1* | 9/2021 | Liu | G06V 40/10 |
| 2022/0028139 A1* | 1/2022 | Mitra | G06V 40/175 |
| 2022/0101144 A1* | 3/2022 | Vahdat | G06N 3/047 |
| 2022/0101577 A1* | 3/2022 | Chakrabarty | G06T 11/60 |
| 2022/0147818 A1* | 5/2022 | Zhang | G06N 3/047 |
| 2022/0215594 A1* | 7/2022 | Tackstrom | G06N 3/088 |
| 2022/0246244 A1* | 8/2022 | Kappel | G06N 3/045 |
| 2022/0385949 A1* | 12/2022 | Galpin | H04N 19/90 |
| 2023/0075100 A1* | 3/2023 | Zavoronkovs | G06N 3/006 |
| 2023/0319321 A1* | 10/2023 | Ickin | H04N 19/94 |
| | | | 382/253 |

* cited by examiner

Input : Sample image $x$, black-box model $f(\cdot)$
Output : Generated Counterfactuals $\tilde{x}$ 1 *Initialize a zero matrix parameter of size $n \times d$*
2 $\Sigma \leftarrow zeros(n, d)$
3 *Get the original output from the black-box model*
4 $y \leftarrow f(x)$
5 *Extract the latent features of the original input*
6 $z \leftarrow q_\phi(x)$
7 *Obtain fisher information on $z$*
8 $f_z \leftarrow F(z)$
9 *Obtain $k$ partitions using spectral clustering*
10 $P \leftarrow SpectralClustering(f_z)$
11 *Initialize counter*
12 $i \leftarrow i + 1$
13 while $i < \tau$ do
14    for *each* $\epsilon, p \in (\Sigma, P)$ do
15       *Perturb the latent features*
16       $\tilde{x} \leftarrow p_\phi(z + \epsilon)$
17       *Pass the perturbed image through the black-box*
18       $\tilde{y} \leftarrow f(\tilde{x})$
19       *Learn to reconstruct $\hat{Y}$ from $Y$*
20       $\mathcal{L} \leftarrow$ compute Eq. 4
21       *Update $\epsilon$ while masking a subset of the gradients*
22       $\epsilon \leftarrow \epsilon + \frac{\mathcal{L}}{d\epsilon} \cdot p$
23    end
24    Update counter
25    $i \leftarrow i + 1$
26 end

FIGURE 5

METHOD AND SYSTEM FOR MEANINGFUL COUNTERFACTUAL EXPLANATIONS

TECHNICAL FIELD

The present invention relates to the field of methods and systems for explaining a classifier.

BACKGROUND

Consider a face authentication system for unlocking a device. In case of non-authentications (possible false-negative predictions), this system could provide generic advices to its user such as "face the camera" or "remove any face occlusions". However, these may not explain the reason for the possible malfunction. To provide more insights regarding its decisions, the system could instead provide information specific to the captured image (i.e., its input data). It might list the input feature that most contributed to its decision (e.g., as a region of the input image), but this feature could be "face", which is trivial and does not suggest an alternative action to its user. Further, it provide little useful information about the model. Instead, valuable and diverse explanations may be key for better understanding and diagnosing the system—including the data it was trained on—and improving its reliability. Such explanations might improve systems across a wide variety of domains including in medical imaging, automated driving systems, and quality control in manufacturing.

The explainability literature aims to understand the decisions made by black-box models such as the aforementioned face authentication system. Counterfactual explanation methods may help discover the limitations of black-box models by uncovering data and model biases. For example, imagine that authentication system always detects a certain person whenever the input image has "black hair" and contains a "smile". The counterfactual explanation methods provide perturbed versions of the input data that emphasize features that contributed most to the black-box model's output. For example, if an authentication system is not recognizing a user wearing sunglasses then the system could generate an alternative image of the user's face without sunglasses that would be correctly recognized. This is different from other types of explainability methods such as feature importance methods and boundary approximation methods. The former highlight salient regions of the input but do not indicate how the black-box could achieve a different prediction.

The second family of methods produce explanations that are limited to linear approximations of the black-box model. Unfortunately, these linear approximations are often inaccurate. In contrast, counterfactual methods suggest changes in the input that would lead to a change in the corresponding output, providing information not only about where the change should be but also what the change should be.

Counterfactual explanations should be actionable and proximal. For example, an actionable explanation would suggest feasible changes like removing sunglasses instead of unrealistic ones such as adding more eyes to the user's face. Most actionable explanations are proximal to the input, since it is easier to interpret a perturbed input that only changes a small number of attributes. The last desideratum is for explanations to be diverse thereby providing a set of actionable changes that each shed light on the model's prediction.

Current counterfactual generation methods like xGEM generate a single explanation that is far from the input. Thus, they fail to be proximal, diverse, and actionable. Progressive Exaggeration (PE) provides higher-quality explanations, making them more proximal than xGEM but still fails to provide a diverse set of non-trivial explanations. Like previous methods in the literature, both methods also tend to provide obvious (or not valuable) explanations about why the model is making a certain decision. Moreover, their image generator must be trained on the same data as the black-box model in order to detect biases thereby limiting their applicability.

Therefore, there is a need for an improved method and system for explanation of classifiers.

SUMMARY

In the following there is presented an explainability method adapted to interpret a black-box function by identifying the attributes that have the most effect on its output. The present explainability method can explain any black-box classifier for which the gradients are accessible. The present explainability method can achieve state of the art in terms of the quality of the explanations by detecting biases on the datasets and producing multiple explanations for an image.

In accordance with a first broad aspect, there is provided a computer-implemented method for explaining an image classifier, the method comprising: a) receiving an initial image, the initial image having been wrongly classified by the image classifier; b) receiving an initial gradient of a function executed by the image classifier generated while classifying the initial image, the function being indicative of a probability for the initial image to belong to an initial class; c) converting the initial image into a latent vector, the latent vector being a representation of the initial image in a latent space; d) generating a plurality of perturbation vectors using the initial gradient of the function executed by the image classifier; e) combining the latent vector with each one of the plurality of perturbation vectors, thereby obtaining a plurality of modified vectors; f) for each one of the plurality of modified vectors, reconstructing a respective image, thereby obtaining a plurality of reconstructed images; g) transmitting the reconstructed images to the image classifier; h) for each one of the plurality of reconstructed images, receiving a respective updated gradient of the function executed by the image classifier; i) using the respective updated gradients, determining amongst the reconstructed images at least one given reconstructed image for which the respective updated gradient is indicative that a new class different from the initial class has been assigned by the image classifier; and j) outputting the at least one given reconstructed image.

In one embodiment, the method further comprises the step of determining amongst the at least one given reconstructed image, at least one particular reconstructed image for which the corresponding latent vector introduces a minimal perturbation to the latent vector, said outputting the at least one given reconstructed image comprising outputting the at least one particular reconstructed image.

In one embodiment, the step of determining the at least one particular reconstructed image comprises for each one of the at least one given reconstructed image, repeating steps d)-h) while using the given reconstructed image as the initial image.

In one embodiment, the step of receiving the initial gradient comprises: converting the initial image into an initial latent vector; reconstructing an initial reconstructed image from the initial latent vector; transmitting the initial reconstructed image to the image classifier; and receiving the initial gradient from the image classifier.

According to another broad aspect, there is provided a system for explaining an image classifier, the system comprising: a processor; and a non-transitory storage medium operatively connected to the processor, the non-transitory storage medium comprising computer readable instructions; the processor, upon executing the computer readable instructions, being configured for: a) receiving an initial image, the initial image having been wrongly classified by the image classifier; b) receiving an initial gradient of a function executed by the image classifier generated while classifying the initial image, the function being indicative of a probability for the initial image to belong to an initial class; c) converting the initial image into a latent vector, the latent vector being a representation of the initial image in a latent space; d) generating a plurality of perturbation vectors using the initial gradient of the function executed by the image classifier; e) combining the latent vector with each one of the plurality of perturbation vectors, thereby obtaining a plurality of modified vectors; f) for each one of the plurality of modified vectors, reconstructing a respective image, thereby obtaining a plurality of reconstructed images; g) transmitting the reconstructed images to the image classifier; h) for each one of the plurality of reconstructed images, receiving a respective updated gradient of the function executed by the image classifier; i) using the respective updated gradients, determining amongst the reconstructed images at least one given reconstructed image for which the respective updated gradient is indicative that a new class different from the initial class has been assigned by the image classifier; and j) outputting the at least one given reconstructed image.

In one embodiment, the processor is further configured for determining amongst the at least one given reconstructed image, at least one particular reconstructed image for which the corresponding latent vector introduces a minimal perturbation to the latent vector, said outputting the at least one given reconstructed image comprising outputting the at least one particular reconstructed image.

In one embodiment, in order to determine the at least one particular reconstructed image, the processor is configured to, for each one of the at least one given reconstructed image, repeat steps d)-h) while using the given reconstructed image as the initial image.

In one embodiment, the processor is further configured for: converting the initial image into an initial latent vector; reconstructing an initial reconstructed image from the initial latent vector; transmitting the initial reconstructed image to the image classifier; and receiving the initial gradient from the image classifier.

According to a further broad aspect, there is provided a system for explaining an image classifier, the system comprising: an encoder for: receiving an initial image, the initial image having been wrongly classified by the image classifier; and converting the initial image into a latent vector, the latent vector being a representation of the initial image in a latent space; a vector generator: receiving an initial gradient of a function executed by the image classifier generated while classifying the initial image, the function being indicative of a probability for the initial image to belong to an initial class; generating a plurality of perturbation vectors using the initial gradient of the function executed by the image classifier; and combining the latent vector with each one of the plurality of perturbation vectors, thereby obtaining a plurality of modified vectors; and a decoder for: for each one of the plurality of modified vectors, reconstructing a respective image, thereby obtaining a plurality of reconstructed images; and transmitting the reconstructed images to the image classifier, wherein the image generator is further configured for: for each one of the plurality of reconstructed images, receiving a respective updated gradient of the function executed by the image classifier; using the respective updated gradients, determining amongst the reconstructed images at least one given reconstructed image for which the respective updated gradient is indicative that a new class different from the initial class has been assigned by the image classifier; and outputting an identification of the at least one given reconstructed image.

In one embodiment, the vector generator is further configured for determining amongst the at least one given reconstructed image, at least one particular reconstructed image for which the corresponding latent vector introduces a minimal perturbation to the latent vector, said outputting the identification of the at least one given reconstructed image comprising outputting an identification of the at least one particular reconstructed image.

In one embodiment, the encoder is further configured for converting the initial image into an initial latent vector, the decoder is further configured for reconstructing an initial reconstructed image from the initial latent vector and transmitting the initial reconstructed image to the image classifier, and the vector generator is configured for receiving the initial gradient from the image classifier.

In one embodiment, the encoder comprises a first neural network executing a first machine learning algorithm and the decoder comprises a second neural network executing a second machine learning algorithm.

In one embodiment, the first and second neural networks are identical.

In one embodiment, the first and second neural networks are trained using a same set of data.

In one embodiment, the same set of data corresponds to a given set of data used for training the image classifier.

BRIEF DESCRIPTION OF THE DRAWINGS

Further features and advantages of the present invention will become apparent from the following detailed description, taken in combination with the appended drawings, in which:

FIG. 5 illustrates an exemplary algorithm for executing the method of FIG. 3.

(FIG. 6a) of a gender-unbiased classifier, and FIG. 6b corresponds to explanations of a gender-biased "Smile" classifier. The classifier output probability is displayed on top of the images while the oracle prediction for gender is displayed at the bottom.

(FIG. 9a) of a gender-unbiased classifier, and FIG. 9b corresponds to explanations of a gender-biased "Smile" classifier. The classifier output probability is displayed on top of the images while the oracle prediction for gender is displayed at the bottom.

FIG. 10a shows the results for all explanations and FIG. 10b shows only successful counterfactuals.

It will be noted that throughout the appended drawings, like features are identified by like reference numerals.

DETAILED DESCRIPTION

Figure 1:
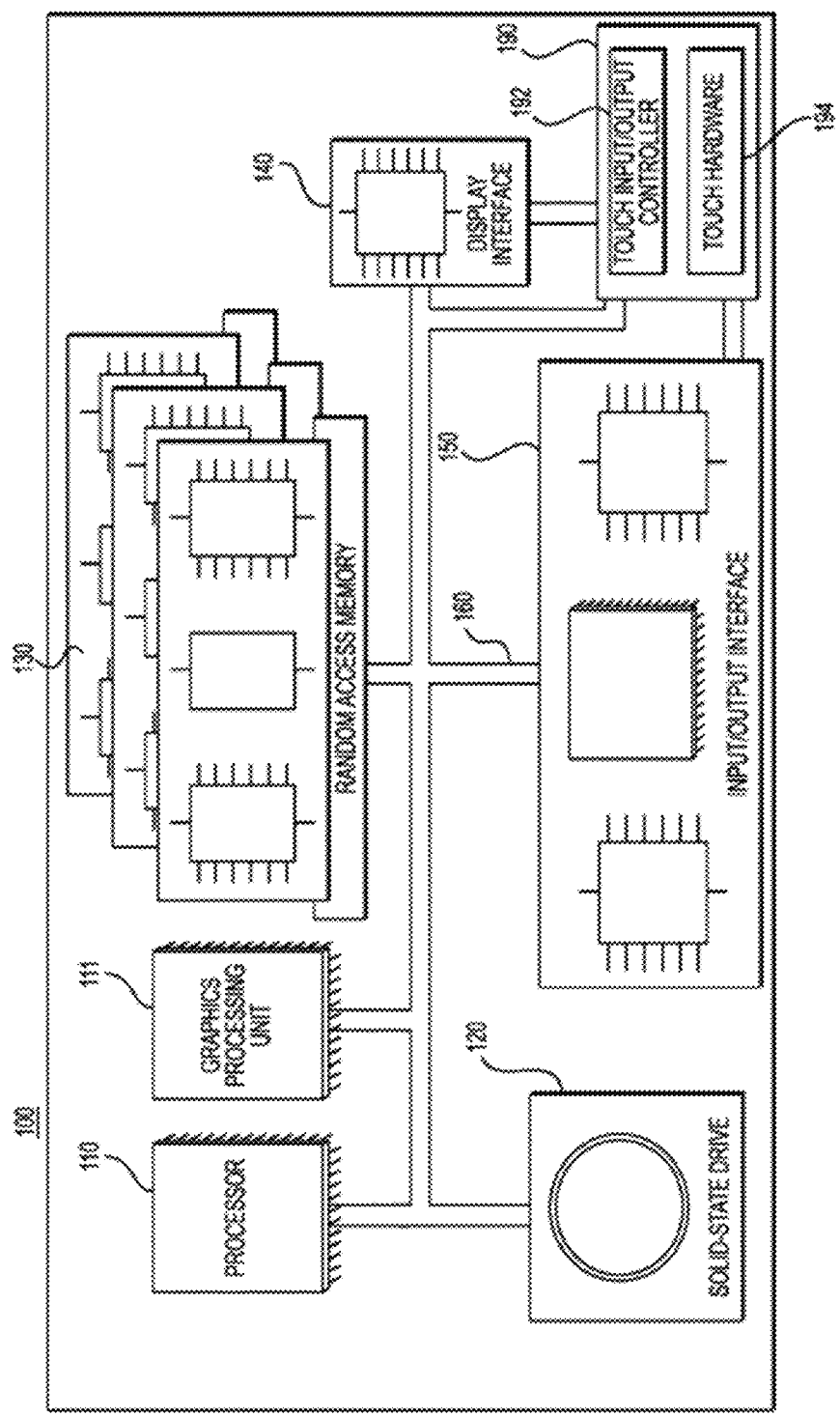
FIG. 1 is a schematic diagram of an electronic device, in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown an electronic device 100 suitable for use with some implementations of the present technology, the electronic device 100 comprising various hardware components including one or more single or multi-core processors collectively represented by processor 110, a graphics processing unit (GPU) 111, a solid-state drive 120, a random access memory 130, a display interface 140, and an input/output interface 150.

Communication between the various components of the electronic device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the electronic device 100 in addition or in replacement of the touchscreen 190.

According to implementations of the present technology, the solid-state drive 120 stores program instructions suitable for being loaded into the random-access memory 130 and executed by the processor 110 and/or the GPU 111. For example, the program instructions may be part of a library or an application.

The electronic device 100 may be implemented as a server, a desktop computer, a laptop computer, a tablet, a smartphone, a personal digital assistant or any device that may be configured to implement the present technology, as it may be understood by a person skilled in the art.

Figure 2:
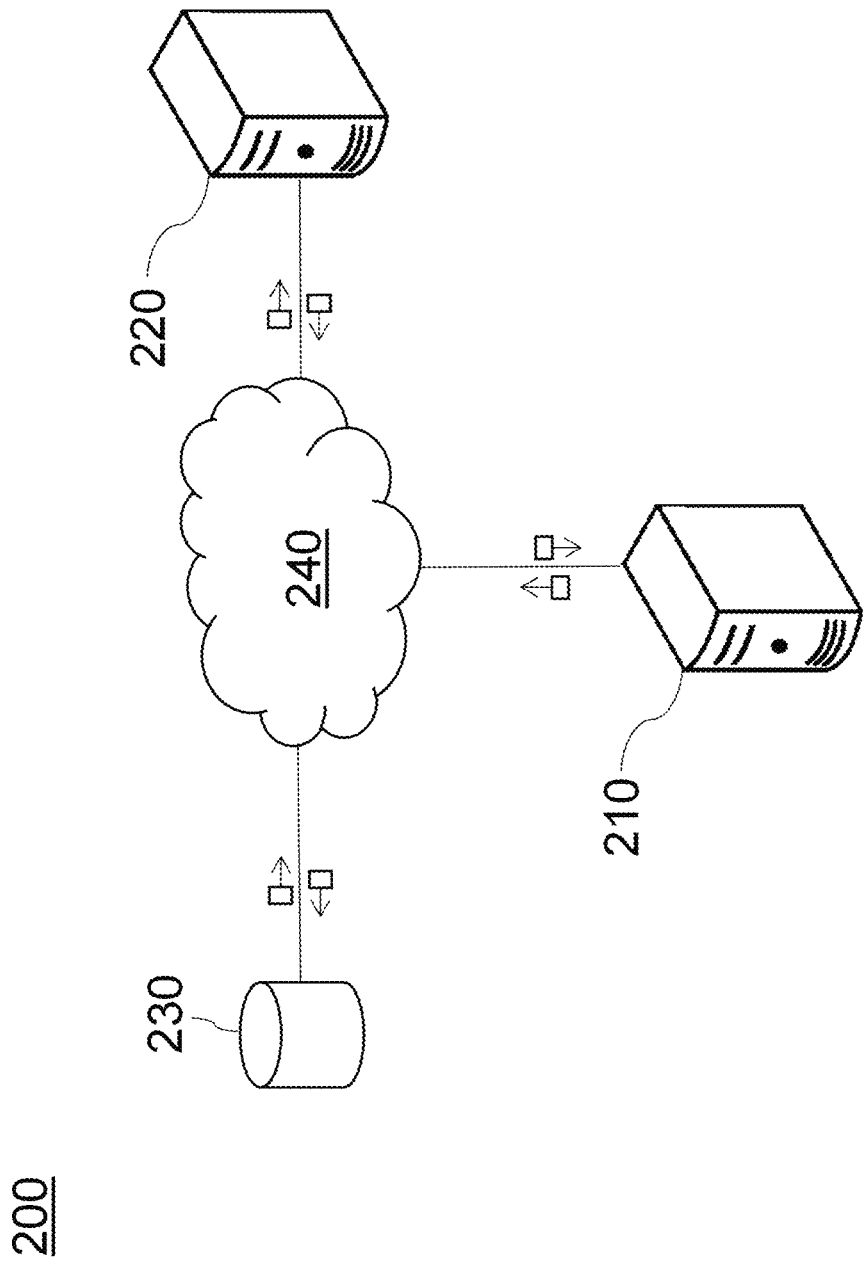
FIG. 2 depicts a schematic diagram of a system, in accordance with non-limiting embodiments of the present technology.

Referring to FIG. 2, there is shown a schematic diagram of a system 200, the system 200 being suitable for implementing non-limiting embodiments of the present technology. It is to be expressly understood that the system 200 as shown is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 200 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 200 may provide in certain instances simple implementations of the present technology, and that where such is the case they have been presented in this manner as an aid to understanding. As persons skilled in the art would understand, various implementations of the present technology may be of a greater complexity.

The system 200 comprises inter alia a first server 210, a second server 220 and a database 230 communicatively coupled over a communications network 240.

Generally speaking, the first server 210 is configured for classifying images, i.e. estimating or determining a particular class to be assigned to an image. The particular is chosen amongst a plurality of predefined classes. In one embodiment, the first server 210 is configured for executing a function of which the output is the probability that the image belongs to the particular class. In one embodiment, the gradient of the function is accessible from the first server 210.

Figure 3:
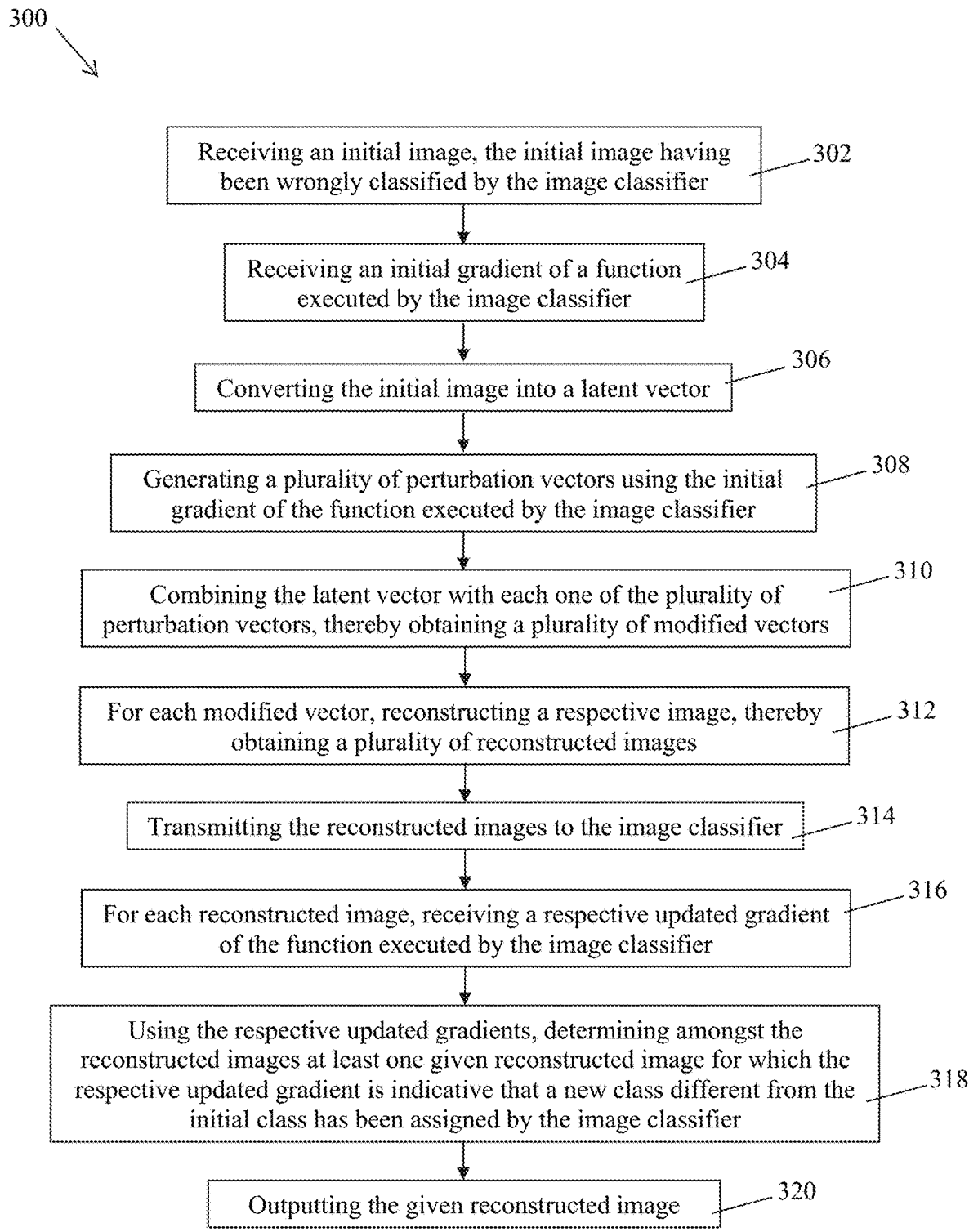
FIG. 3 is a flow chart illustrating a method for explaining an image classifier, in accordance with non-limiting embodiments of the present technology.

The first server 210 can be implemented as a conventional computer server and may comprise at least some of the features of the electronic device 100 shown in FIG. 3. In a non-limiting example of an embodiment of the present technology, the first server 210 can be implemented as server running an operating system. Needless to say, the first server 210 can be implemented in any other suitable hardware and/or software and/or firmware or a combination thereof. In the shown non-limiting embodiment of present technology, the first server 210 is a single server. In alternative non-limiting embodiments of the present technology, the functionality of the first server 210 may be distributed and may be implemented via multiple servers (not shown).

The implementation of the first server 210 is well known to the person skilled in the art of the present technology.

However, briefly speaking, the first server 210 comprises a communication interface (not shown) structured and configured to communicate with various entities (such as the knowledge source 230, for example and other devices potentially coupled to the network) via the network 240. The first server 210 further comprises at least one computer processor (e.g., the processor 110 of the electronic device 100) operationally connected with the communication interface and structured and configured to execute various processes to be described herein.

Referring back to FIG. 2, at least one database 230 having stored therein images such as training images is communicatively coupled to the first and second servers 210 and 220 via the communications network 240. Although the database 230 is illustrated schematically herein as a single entity, it is contemplated that the database 230 may be configured in a distributed manner, for example, the database 230 could have different components, each component being configured for a particular kind of retrieval therefrom or storage therein.

The data source 230 may be a structured collection of data, irrespective of its particular structure or the computer hardware on which data is stored, implemented or otherwise rendered available for use. The database 230 may reside on the same hardware as a process that stores or makes use of the information stored in the database 230 or it may reside on separate hardware, such as on the first server 220. Generally speaking, the database 230 may receive data from the first server 220 for storage thereof and may provide stored data to the first server 220 for use thereof.

Referring back to FIG. 2, the system 200 also comprises the second server 220.

Generally speaking, the second server 220 is configured for receiving an initial image, the initial image having been wrongly classified by the first server 210; receiving from the first server 210 an initial gradient of the function executed by the first server 210 while classifying the initial image, the function being indicative of the probability for the initial image to belong to an initial class; converting the initial image into a latent vector, the latent vector being a representation of the initial image in a latent space; generating perturbation vectors using the initial gradient of the function; combining the latent vector with each one of the perturbation vectors, thereby obtaining a plurality of modified vectors; for each modified vector, reconstructing a respective image, thereby obtaining a plurality of reconstructed images; transmitting the reconstructed images to the first server 210; for each reconstructed image, receiving a respective updated gradient of the function executed by the first server 210; determining the reconstructed images for which the respective updated gradient is indicative that a new class different from the initial class has been assigned by the first server 210, at least one given reconstructed images for which the corresponding latent vector introduces a minimal perturbation to the latent vector; and outputting the given reconstructed images.

Similarly to the first server 210, the second server 220 can be implemented as a conventional computer server and may comprise some or all of the features of the electronic device 100 shown in FIG. 1. In a non-limiting example of an embodiment of the present technology, the second server 220 can be implemented as server running an operating system. Needless to say, the second server 220 can be implemented in any other suitable hardware and/or software and/or firmware or a combination thereof. In the shown non-limiting embodiment of present technology, the second server 220 is a single server. In alternative non-limiting embodiments of the present technology, the functionality of the second server 240 may be distributed and may be implemented via multiple servers (not shown).

The implementation of the second server 220 is well known to the person skilled in the art of the present technology. However, briefly speaking, the second server 220 comprises a communication interface (not shown) structured and configured to communicate with various entities (such as the first server 210 and the data source 230, for example and other devices potentially coupled to the network) via the network. The second server 220 further comprises at least one computer processor (e.g., the processor 110 of the electronic device 100) operationally connected with the communication interface and structured and configured to execute various processes to be described herein.

In some non-limiting embodiments of the present technology, the first server 210 and the second server 220 may be implemented as a single server. In other non-limiting embodiments, functionality of the first server 210 and/or the second server 220 may distributed among a plurality of electronics devices.

In some embodiments of the present technology, the communication network 240 is the Internet. In alternative non-limiting embodiments, the communication network 240 can be implemented as any suitable local area network (LAN), wide area network (WAN), a private communication network or the like. It should be expressly understood that implementations for the communication network 240 are for illustration purposes only. How a communication link (not separately numbered) between the first server 210, the database 230, the second server 220 and/or another electronic device (not shown) and the communications network 240 is implemented will depend inter alia on how each electronic device is implemented.

FIG. 3 illustrates one embodiment of a computer implemented method 300 for explaining an image classifier. For example, the method 300 may be executed by the second server 220 while the image classifier may be stored on the first server 210. The goal of the method 300 is to determine minimal perturbations or changes to be made to an image for the image to be differently classified by the image classifier, to output images corresponding the determined minimal perturbations.

While the description is directed to a method 300 for explaining an image classifier, it should be understood that the method 300 may be used for explaining any classifier and is not limited to image classifiers as long as the classifier determines gradient of the function (including black-box functions) executed by the classifier is accessible.

At step 302, an initial image is received. The initial image corresponds to an image that was wrongly classified by the image classifier. The image classifier is configured for assigning a given class or category amongst a plurality of classes or categories to an image. The image classifier executes a classifying function and outputs a value being indicative of the probability that an image belongs to a given class. For example, an image classifier may be configured to classify images of persons as "smiling" or "not smiling", i.e. the image classifier is configured for determining if a person appearing on an image or picture is smiling or not. In this case, the image classifier may output a value being indicative of the probability that the image belongs to the "smiling" class, i.e. the probability that the person appearing on the image is smiling. For example, if the probability determined by the image classifier is below 0.5, then the image is considered as belonging to the "not smiling" class whereas if the determined probability is equal to 0.5 or greater than 0.5, then the image is considered as belonging to the "smiling" class.

In one embodiment, the user of the image classifier may determine that the image classifier has wrongly classified the initial image. For example, the image classifier may have erroneously classified the initial image as belonging to the "not smiling" class while the person appearing on the initial image actually smiles.

It should be understood that the image classifier may execute any adequate function that allows for assigning a class to an image and from which the gradient of the function determined while classifying an image is accessible, i.e., the gradient of the function may be output by the image classifier.

At step 304, the gradient of the function associated with the initial image is received, i.e., the gradient of the function of the image classifier determined while classifying the initial image is received. For example, the gradient of the function may have been stored on the database 230 and transmitted to the second server 220 along with the initial image. In another example, the first server 210 may transmit the gradient of the function to the second server 220 along with the initial image.

At step 306, the received initial image is converted into a vector of a latent space referred hereinafter as the initial vector. The initial vector is a representation of the initial image within the latent space. Each dimension of the latent space represents a different semantic concept.

At step 308, a plurality of perturbation vectors are generated using the initial gradient received at step 304. Each perturbation vector has the same dimension as that of the initial vector and is generated to introduce a perturbation in the initial vector. If the initial vector comprises N elements, then a perturbation vector also comprises N elements. Each element of a perturbation vector may be seen as a variation for its respective element in the initial vector. It should be understood that a variation may be equal to zero, may be positive or may negative.

At step 310, each perturbation vector is combined with the initial vector, thereby obtaining a plurality of modified vectors. A modified vector corresponds to the initial vector of which the value of at least one of its elements has been changed.

In one embodiment, a modified vector is obtaining by adding a perturbation vector to the initial vector. In another embodiment, a modified vector is obtaining by subtracting a perturbation vector from the initial vector. It should be understood that combinations of the initial vector and the perturbation vector other than additions and subtractions may be used.

At step 312, a respective image is reconstructed for each modified vector, thereby obtaining a plurality of reconstructed images. Each reconstructed image corresponds to the initial image of which at least one characteristic has been modified. For example, the color of the teeth of the person on a reconstructed image may have been changed with respect to the initial image. In another example, the shape of the lips of the person on a reconstructed image may have been changed with respect to the initial image.

At step 314, each reconstructed image is transmitted to the image classifier. The image classifier classifies each reconstructed image and outputs the gradient for each reconstructed image.

At step 316, the gradient determined by the image classifier is received for each reconstructed image.

At step 318, based on the gradient received at step 316 for each reconstructed image, the perturbation vector(s) that allow(s) for a change of classification with respect to the class assigned to the initial image are identified.

At step 320, the particular reconstructed image corresponding to the perturbation vector(s) identified at step 318 is outputted. In one embodiment, the particular reconstructed image is stored in memory. For example, the particular reconstructed image may be transmitted to the database 230. In another embodiment, the particular reconstructed image may be provided for display on a user display unit.

In one embodiment, at step 318, a first group of perturbation vectors is first identified. The first group of perturbation vectors comprises all of the perturbation vectors for which the corresponding reconstructed vectors have been assigned by the image classifier a class that is different from the initial class. Then the particular perturbation vector(s) that introduce(s) the least perturbation to the initial vectors is(are) identified from the first group of perturbation vectors.

In one embodiment and in order to identify the perturbation vector that introduce the least perturbation to the initial vector, steps 308-316 are repeated. For example, a first perturbation vector having N elements may be generated. For example, the value of all of the elements except the first element is set to zero and the value of the first element is set to 1 based on the gradient received at step 304. The first perturbation vector is added to the initial vector to obtain a first modified vector. A first reconstructed image is generated based on the first modified vector and transmitted to the image classifier. The image classifier returns the gradient of its function associated with the first reconstructed image. A new perturbation vector is generated based on the gradient received for the first reconstructed image (and optionally also based on the previously received gradient), i.e. the values of the elements of the first perturbation vector are changed to obtain a second perturbation vector. For example, the value of all of the elements except the first element remains equal to zero and the value of the first element may be set to 0.5. A second reconstructed image is generated based on the combination of the second perturbation vector and the initial vector. The second reconstructed image is transmitted to the image classifier which returns a new gradient value. The new gradient value may indicate that the class assigned to the second reconstructed image is different from the initial class. The method 300 may stop at this step and the second reconstructed image may be output.

Alternatively, steps 308-316 may be repeated to find the minimal value for the first element of the perturbation vector (assuming that the value of all of the other elements remain equal to zero) that allow the image classifier to assign a class different form the initial class to a reconstructed image. The reconstructed image corresponding to the perturbation vector having the minimal first element value is then outputted.

While in the above example, the vector that introduces the least perturbation for the classifier to assign a different class to the image is obtain by minimizing the value of its first element, it should be understood that this vector may be obtained by maximizing the value of its first element depending on the semantic concept represented by the first element. It should also be understood that the value of elements of the perturbation vector other than the first element may be varied and/or the value of more than one element of the perturbation vector may be varied.

In one embodiment, the perturbation vectors, and therefore, the modified vectors, may be iteratively generated. In another embodiment, at least two perturbation vectors may be concurrently generated. Similarly, at least two modified vectors may be concurrently generated.

In one embodiment, the method 300 further comprises the following steps to obtain the gradient of the function associated with the initial image. The received initial image is first converted into an initial latent vector. An initial reconstructed image of the initial image is then generated using the initial latent vector. The initial reconstructed image is transmitted to the image classifier which assigns a class to the initial reconstructed image (i.e. the initial class) and outputs the gradient of the function corresponding to the initial reconstructed image, which then corresponds to the initial gradient received at step 304.

Figure 4:
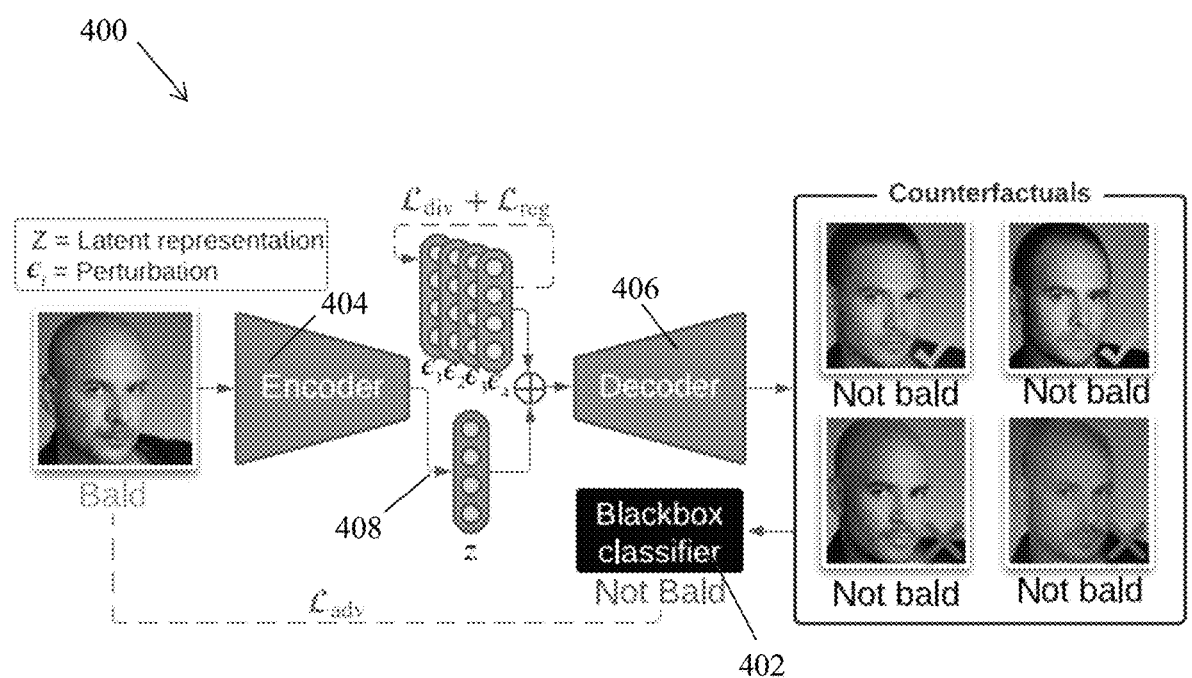
FIG. 4 is block diagram illustrating a system for explaining an image classifier, in accordance with non-limiting embodiments of the present technology.

FIG. 4 illustrates one embodiment of a system 400 for explaining an image classifier 402, i.e. determining the minimal perturbations to be made to an image so that the image classifier changes the call or category assigned to the image and outputting the images corresponding to the minimal perturbations. For example, the system 400 may be used for determining the minimal perturbations to be made to an image that was wrongly classified by the image classifier 402.

The system 400 comprises an encoder 404, a decoder 406 and a vector generator 408. The encoder 404 is configured for converting an image into a vector, i.e. generating a vector representation of an image in a latent space. The decoder 406 is configured for converting a vector of the latent space into an image. The vector generator 408 is configured for generating perturbation vectors according to a gradient of the function of the image classifier 402 and combining the perturbation vectors each with an initial vector.

In operation, an initial image and the gradient of the function executed by the image classifier 402 while classifying the initial mage are inputted into the system 400. For example, the initial image may be an image of a smiling woman and the initial image may have been wrongly classified as "not smiling" by the image classifier 402.

The encoder 404 receives the initial image and converts it into a vector representation in a latent space, i.e. the encoder 404 generates an initial vector that represents the initial image in the latent space. Each dimension of the latent space represents a different semantic concept so that each element of the initial vector represents a respective semantic concept.

The vector generator 408 receives the gradient corresponding to the initial image and the initial vector, and generates at least one perturbation vector using the received gradient. Then the vector generator 408 combines the perturbation vector with the initial vector to obtain a modified vector.

The perturbation vector and the modified each have the same dimension as that of the initial vector. The modified vector corresponds to the initial vector of which the value of at least one of its element has been modified. Each element of a perturbation vector may be seen as a variation for its respective element in the initial vector. It should be understood that a variation may be equal to zero, may be positive or may negative.

In one embodiment, the vector generator 408 is configured for adding together the initial vector and the perturbation vector to obtain the modified vector. In another embodiment, the vector generator 408 is configured for subtracting the perturbation vector from the initial vector to obtain the modified vector to obtain the modified vector.

The modified vector is transmitted to the decoder 406 which converts the modified vector into a reconstructed image. The reconstructed image corresponds to the initial image of which at least one characteristic has been modified by modifying the value of at least one element of the initial vector.

The decoder 404 transmits the reconstructed image to the image classifier. The image classifier classifies the reconstructed image and outputs the gradient corresponding to the reconstructed image. The gradient associated with the reconstructed image (and therefore with the previously generated perturbation vector) is transmitted to the vector generator 408.

In one embodiment, if the gradient associated with the reconstructed image indicates that the class assigned to the reconstructed image is different from the initial class assigned to the initial image, the decoder 406 may output the reconstructed image.

In another embodiment, the generation of perturbation vectors continues until a perturbation vector that introduces a minimal perturbation to the initial image while still allowing the image classifier 408 to assign a class different from the initial class is found. In this case, the vector generator 408 generates a second perturbation vector based on the first perturbation vector, the received gradient associated with the reconstructed image and optionally the gradient associated with the initial image, i.e. the vector generator 408 modifies the first perturbation vector using the gradient associated with the reconstructed image to obtain the second perturbation vector. The second perturbation vector is decoded by the decoder 406 which generates a second reconstructed image. The second reconstructed image is sent to the image classifier 408 which assigns a class to the second reconstructed image and outputs the gradient corresponding to the second reconstructed image. The gradient associated with the second reconstructed image is transmitted to the vector generator 408. If the gradient associated with the second reconstructed image indicates that the class assigned to the second reconstructed image is the same as the initial class assigned to the initial image, then the vector generator 408 generates a third perturbation vector based on the different received gradients. If the gradient associated with the second reconstructed image indicates that the class assigned to the second reconstructed image is different from the initial class assigned to the initial image, a third perturbation vector may also be generated based on the different received gradients. These steps are repeated until a given perturbation vector that introduces a minimal perturbation to the initial vector and allows the image classifier 408 to assign a class different from the initial class to the reconstructed image corresponding to the given perturbation vector be found. Then the reconstructed image corresponding to the given perturbation vector is outputted.

While in the above description, the operation of the system 400 is described for the generation of a single perturbation vector which is then iteratively modified, it should be understood that the system 400 may be configured for generating a plurality of perturbation vectors which may be then iteratively modified until a plurality of perturbation vectors that each introduce a minimal perturbation to the initial vector and each allow the change of classification be found. For example, the initial vector may comprise N elements. In this case, N perturbation vectors each for changing the value of a respective and different element of the initial vector may be generated. The N perturbation vectors may each be iteratively modified as described above until each one of the N perturbation vectors introduces a respective minimal perturbation to the initial vector to change the class assigned by the image classifier 402. While in this example, the N elements of the initial vectors are modified each through a respective perturbation vector, it should understood that the number of perturbation vectors may vary so that not all of the elements of the initial vector be modified. Similarly, a perturbation vector may modify more than one element of the initial vector.

In one embodiment, the encoder 402, the decoder 404 and/or the vector generator are configured for executing a machine learning algorithm. In this case, the encoder 402, the decoder 404 and/or the vector generator 408 are trained prior to the operation of the system 400. In one embodiment, the encoder 402 and the decoder 404 are trained concurrently. For example, they may be trained using the same set of training images that was used to train the image classifier 402. Alternatively, a different set of images may be used for training the encoder 404 and the decoder 406.

In one embodiment, the encoder 402 and decoder 404 comprise a same neural network that is trained to encode its input into a smaller latent space Z, discarding irrelevant information, and modelling the most important factors of variation in the data. In this case, the neural network is configured for performing both the encoding and decoding. The encoder compresses the input (i.e., the initial image) into a smaller vector Z and the decoder recovers the input from Z. In one embodiment, such as model allows that different dimensions of Z may encode different semantic concepts of the input, thereby the interpretation of the image classifier 402. Moreover, altering a concept in Z and decoding it may produce a new unseen sample that expresses the new traits encoded in Z.

In one embodiment, the neural network is trained so as to minimize the information that may be lost during the encoding-decoding process. Thus, the output and the input are compared and the neural network is optimized to minimize the distance between them. The distance may be measured as the Euclidean distance for example. In one embodiment and in order to minimize the production of blurry outputs that try to match the input "in average", the input of the encoder and the output of the decoder are fed into a further neural network that extracts discriminative features. The further, neural network may be any adequate off-the-shelf pre-trained classifier for example. Then the distance between the input and the output is computed in this feature space. These features are invariant to small changes in their input and they extract information about its structure. Thus, as long as the structure of the output is correct, the decoder has more room to predict individual values outside the "average response". This results in less blurry reconstructions.

In one embodiment and since Z is made of real numbers, the encoder may learn to assign a distinct unique code to each input, thereby producing perfect reconstructions, but being unable to decode values in between two codes (i.e., failing to interpolate). In order to alleviate this problem, Z may be converted into a probabilistic value from which samples can be drawn. As a result, an encoded input cannot take a single precise value because of the noise introduced during sampling. Usually, the encoder is trained to predict the mean and the variance of a Gaussian distribution around a datapoint. However, the encoder could still output a variance of 0, incurring in the above-described problem. To solve this, apart from minimizing the reconstruction distance, the distance between each dimension of Z and a normal distribution (mean 0 and variance 1) may also be minimized. Since the distance between two distributions is minimized, a metric called Kullback Leibler Divergence (KL Divergence) may be used.

In one embodiment, another desirable property of Z may be that each of its dimensions models a single concept of the input. However, the previous optimization procedure does not account for this, possibly producing subsets of Z to be highly related (entangled). To produce disentangled concepts, a variation of the KL divergence that explicitly models and helps minimizing the total correlation between each pair of dimensions in Z may be used.

In the following, there is described an exemplary embodiment of the method 300 which is hereinafter referred to as Diverse Valuable Explanations (DiVE).

In this example, DiVE corresponds to an explainability method that can interpret a black-box model by identifying sets of valuable attributes that have the most effect on the model's output. DiVE produces multiple counterfactual explanations which are actionable, diverse, valuable and more proximal than the previous literature. DiVE first uses a β-TCVAE (Total Correlation Variational Autoencoder) to learn a disentangled latent representation of the data. Unlike PE, training DiVE does not require the original data used to train the black-box model nor the black-box itself, even though the original data may be used for training DiVE. Then DiVE learns a latent perturbation using constraints to ensure diversity and proximality. In addition, DiVE leverages the Fisher information matrix of its latent space to focus its search on the less influential factors of variation of the black-box. This mechanism enables the discovery of spurious correlations learned by the black-box.

DiVE is tested using two existing benchmarks. Using the first benchmark, we compare the quality of the explanations with xGEM and Progressive exaggeration. With the second benchmark, DiVE's ability to detect biases in the black-box model and the data is evaluated. There is also introduced a new benchmark where we evaluate the model's ability to generate valuable explanations, i.e., which are simultaneously proximal and actionable. As shown below, DiVE achieves state-of-the-art results in the first two setups, and establishes the first baseline for the setup of valuable explanations.

DiVE is an explainability method that can interpret a black-box model by identifying the latent attributes that have the most effect on its output. As illustrated in FIG. 4, DiVE requires an encoder 404, a decoder 406, and fixed weight black-box model 402. The black-box model may be any function for which the gradients may be accessed. In this example, focus is paid on a binary image classifier in order to produce visual explanations. DiVE consists of two main steps. First, the encoder 404 and the decoder 406 are trained in an unsupervised manner to approximate the data distribution on which the black-box model was trained. Unlike PE, the present encoder-decoder model does not need to train on the same dataset that the black-box model was trained on. Second, a set of vectors $\epsilon_i$ are optimized to perturb the latent representation z generated by the trained encoder. The details of the optimization procedure are provided in the algorithm illustrated in FIG. 5. The following three main losses are used for this optimization: an adversarial loss $\mathcal{L}_{adv}$ that attempts to fool the black-box model, an adversarial regularization loss $\mathcal{L}_{reg}$ that constrains the explanations with respect to the number of changing attributes, and a diversity loss $\mathcal{L}_{div}$ that enforces the model to produce multiple explanations with only one confounding factor for each of them.

Obtaining Meaningful Representations.

Given a data sample $x \in X$, its corresponding target $y \in \{0, 1\}$, and a potentially biased black-box model f(x) that approximates p(y|x), the present method finds perturbed version of the same input $\tilde{x}$ that produces a desired probabilistic outcome $\hat{y} \in [0, 1]$, so that $f(\tilde{x})=\tilde{y}$. In order to produce semantically meaningful counterfactual explanations, perturbations are performed on a latent representation $z \in Z$ of the input x. In one embodiment, each dimension in Z represents a different semantic concept of the data, i.e., the different dimensions are disentangled.

In one embodiment, for training the encoder-decoder architecture, β-TCVAE is used since it has been shown to obtain competitive disentanglement performance. However, it should be understood that methods other than β-TCVAE can be used for training the encoder-decoder architecture. It follows the same encoder-decoder structure as the VAE, i.e., the input data is first encoded by a neural network $q_\phi(z|x)$ parameterized by $\varphi$. Then, the input data is recovered by a decoder neural network $p_\theta(x|z)$, parameterized by $\theta$. Using a prior p(z) and a uniform distribution over the indexes of the dataset p(i), the original VAE loss is written as follows:

$$\mathcal{L}_{VAE} = \mathbb{E}_{p(i)} \mathbb{E}_{q(z|x_i)}[\log p_\theta(x_i|z)] - \mathbb{E}_{p(i)} D_{KL}(q_\phi(z|x_i)\|p(z)), \qquad (1)$$

where the first term is the reconstruction loss and the second is the average divergence from the prior. The core difference of β-TCVAE is the decomposition of this average divergence as follows:

$$\mathbb{E}_{p(i)} D_{KL}(q_\phi(z|x_i)\|p(z)) \to D_{KL}(q_\phi(z,x_i)\|q_\phi(z)p_\theta(x_i)) + \Sigma_j D_{KL}(q_\phi(z_j)\|p(z_j)) + \beta \cdot D_{KL}(q_\phi(z)\|\Pi_j q_\phi(z_j)), \qquad (2)$$

where the arrow represents a modification of the left terms and equality is obtained when β=1. The third term on the right side is called total correlation and measures the shared information between all empirical marginals $q_\phi(z_j)=\mathbb{E}_{p(i)} q_\phi(z_j|x_i)$. By using β>1, this part is amplified and encourages further decorrelations between the latent variables and leads to better disentanglement.

In addition to β-TCVAE, a perceptual reconstruction loss is used. This replaces the pixel-wise reconstruction loss in Equation 1 by a perceptual reconstruction loss, using the hidden representation of a pre-trained VGG:

$$\mathbb{E}_{q(z|x_i)}[\log p_\theta(x_i|z)] \to \mathbb{E}_{q(z|x_i)}[\log p_\theta(VGG(x_i)|z)]. \qquad (3)$$

Once trained, the weights of the encoder and the decoder are kept fixed for the rest of the steps of the method.

Interpreting the Black-Box Model

In order to find weaknesses in the black-box model, the explainer searches for a collection of n latent perturbation $\{\epsilon_i\}_{i=1}^n$ such that the decoded output $\tilde{x} \sim p_\theta(x|z+\epsilon_i)$ yields a specific response from the black-box model, i.e., $f(\tilde{x})=\tilde{y}$ for any chosen $\tilde{y} \in [0, 1]$. $\epsilon$ is found by minimizing the following loss terms:

$$\mathcal{L}_{DiVE}(x,\tilde{y},\{\epsilon_i\}_{i=1}^n) = \Sigma_i \mathcal{L}_{adv}(x,\tilde{y},\epsilon_i) + \lambda \cdot \Sigma_i \mathcal{L}_{reg}(x,\epsilon_i) + \alpha \cdot \mathcal{L}_{div}(\{\epsilon_i\}_{i=1}^n), \qquad (4)$$

where λ and α determines the relative importance of each terms. The specificity of the individual terms are described in the rest of this section.

Adversarial Loss

The goal of this loss function is to identify a change of latent attributes that will cause the black-box classifier f to change its prediction. For example, in face recognition, if the classifier detects that there is a smile present whenever the hair is brown, then this loss function is likely to change the hair color attribute. This is achieved by sampling from the decoder $\tilde{x} \sim p(x|z+\epsilon)$, and optimizing the binary cross-entropy between the target $\tilde{y}$, and the prediction $f(\tilde{x})$:

It should be noted that since the function f and decoder $p_a$ have fixed parameters, there is no min-max game to be solved. Hence DiVE does not suffer from traditional instabilities of adversarial algorithms.

Regularization Loss

The goal of this loss function is to constrain the reconstruction produced by the decoder to be similar in appearance and attributes as the input. It consists of the following two terms, $$\mathcal{L}_{reg}(x,\epsilon) = \|x-\tilde{x}\|_1 + \gamma \cdot \|\epsilon\|_1, \quad (6)$$

where $\gamma$ is a scalar weighting the relative importance of the two terms. The first term ensures that the explanations can be related to the input by constraining the input and the output to be similar. The second term aims to identify a sparse perturbation to the latent space Z that confounds the black-box model. This sparsity constrains the explainer to identify the least amount of attributes that affect the classifier's decision in order to produce proximal and actionable explanations.

Diversity Loss

This loss prevents the multiple explanations of the model from being identical. For instance, if gender and hair color are spuriously correlated with smile, the model should provide images either with different gender or different hair color. To do so, we jointly optimize for a collection of n perturbations $\{\epsilon_i\}_{i=1}^n$ and minimize their pairwise similarity:

$$\mathcal{L}_{div}(\{\epsilon_i\}_{i=1}^n) = \sqrt{\sum_{i \neq j}(\epsilon_i^T \epsilon_j)^2}. \quad (7)$$

Beyond Trivial Explanations

Minimizing the losses above may produce trivial counterfactual explanations. For instance, in order to explain why a classifier incorrectly classified an image as containing a "smiling" face, the explainer could just exaggerate smile on that face, without considering other subtle, valuable biases in the data or the black-box model such as hair color. To produce other explanations that are not trivial, we look into the set of the most influential dimensions of Z that are based on the Fisher Information Matrix (F) of the latent space with respect to the $\mathcal{L}_{adv}$.

Each of these dimensions has a corresponding magnitude obtained from the diagonal of F, which represents its influence on the black-box output.

To identify the most valuable explanations, c is sorted by the magnitude of f=diag(F). Then, the dimensions of the sorted c are divided into N contiguous partitions of size $$k = \frac{D}{N},$$

where D is the dimensionality of Z. Formally, let $\epsilon^{(f)}$ be $\epsilon$ sorted by f, then $\epsilon^{(f)}$ is constrained as follows, $$\epsilon_{i,j}^{(f)} = \begin{cases} 0, & \text{if } j \in [(i-1)\cdot k, i \cdot k] \\ \epsilon_{i,j}^{(f)}, & \text{otherwise} \end{cases}, \quad (8)$$

where $i \in 1 \ldots N$ indexes each of the multiple c, and $j \in 1 \ldots D$ indexes the dimensions of $\epsilon$. As a result, partitions with different order of complexity are obtained. Masking the first partition results in explanations that are most implicit within the model and the data. On the other hand, masking the last partition results in explanations that are more explicit.

The choice of k is important as it controls the number of partitions. Higher number of partitions might lead to partitions that do not have enough dimensions to make an accurate explanation. Lower number of partitions might lead to partitions that are not implicit enough. In order to choose subsets of Z in a more principled way, dimensions are grouped using spectral clustering based on similarities obtained from F.

Spectral clustering is a method to find communities of nodes in a graph based on their similarity. In the present case, the nodes are the different dimensions of the latent space, and their similarity with respect to the black-box model is expressed by the off-diagonal of F. Then, given the similarity F, spectral clustering finds k disjoint partitions of Z by first computing the normalized graph Laplacian ($L^{norm}$) of F:

$$L^{norm} = I - D^{-\frac{1}{2}} F D^{-\frac{1}{2}}, D_{i,j} = \sum_j F_{i,j}. \quad (9)$$

This clustering method allows to obtain partitions that are sorted based on the top-k eigenvectors of $L^{norm}$ where the eigenvalues represent how implicit is the corresponding explanation of the partition.

EXPERIMENTAL RESULTS

In the following, the above-described methods are evaluated on three different aspects: (1) the quality of the generated explanations; (2) the ability to discover biases within the black-box model and the data; and (3) the ability to identify diverse valuable explanations for image misclassifications made by the black-box model.

Experimental Setup

As common procedure, experiments are performed on the CelebA database. CelebA is a large-scale dataset containing more than 200K celebrity facial images. Each image is annotated with 40 binary attributes such as "Smiling", "Male", and "Eyeglasses". These attributes allow for evaluating counterfactual explanations by determining whether they could highlight spurious correlations between multiple attributes such as "lipstick" and "smile". In this setup, explainability methods do not have access to the labeled attributes during training. The labels can only be used during validation.

In the following, four versions of the DiVE method are compared to three existing methods. (1) DiVE does not mask the gradient updates of ε. (2) DiVE—is the same as DiVE but uses the MAE reconstruction loss on the pixel space for training the autoencoder. (3) DiVE-F extends DiVE by using Fisher Information on the latent features and masks based on the partitions extracted from a sorted list of Fisher magnitudes. (4) DiVE-FS is the same as DiVE-F but uses spectral clustering for obtaining the partitions as described above. (5) xGEM as described in Shalmali Joshi, Oluwasanmi Koyejo, Been Kim, and Joydeep Ghosh. xgems: Generating examplars to explain black-box models. arXiv preprint arXiv:1806.08867, 2018. (6) xGEM+ is the same as xGem but uses the same auto-encoding architecture as DiVE. (7) PE as described in the following publication: Sumedha Singla, Brian Pollack, Junxiang Chen, and Kayhan Batmanghelich. Explanation by progressive exaggeration. In *International Conference on Learning Representations*, 2020 (hereinafter referred to as Singla). The details and architecture description of the methods are provided below.

TABLE 1

DiCe architecture for 128 × 128 images.

| RGB image $x \in \mathbb{R}^{128 \times 128 \times 3}$ | $z \in \mathbb{R}^{128}$ |
|---|---|
| ResBlock down 3 ch → 16 ch | Linear 128 ch → 128 ch |
| ResBlock 16 ch → 32 ch | Linear 128 ch → 128 ch |
| ResBlock down 32 ch → 32 ch | Linear 128 ch → 128 ch × 4 × 4 |
| ResBlock 32 ch → 64 ch | ResBlock up 128 ch → 64 ch |
| ResBlock down 64 ch → 64 ch | ResBlock up 64 ch → 32 ch |
| ResBlock 64 ch → 128 ch | ResBlock 32 ch → 16 ch |
| ResBlock down 128 ch → 128 ch | ResBlock up 16 ch → 16 ch |
| ResBlock 128 ch → 128 ch | ResBlock 16 ch → 16 ch |
| ResBlock down 128 ch → 128 ch | ResBlock up 16 ch → 16 ch |
| IN, Swish, Linear 128 ch × 4 × 4 → 128 ch | ResBlock 16 ch → 16 ch |
| IN, Swish, Linear 128 ch → 128 ch | IN, Swish, Conv 16 ch → 3 tanh |
| IN, Swish, Linear 128 ch → 128 ch × 2 | (b) Decoder |
| $z \sim \mathcal{N}$ ($\mu \in \mathbb{R}^{128}, \sigma \in \mathbb{R}^{128}$) | |
| (a) Encoder | | ch represents the channel width multiplier in each network.

DiVE's architecture is a variation BigGAN as shown in Table 1. This architecture is chosen because it achieved impressive FID results on the ImageNet. The decoder (Table 1b) is a simplified version of the 128×128 BigGAN's residual generator, without non-local blocks nor feature concatenation. InstanceNorm is used instead of BatchNorm to obtain consistent outputs at inference time without the need of an additional mechanism such as recomputing statistics. All the InstanceNorm operations of the decoder are conditioned on the input code z in the same way as FILM layers. The encoder (Table 1a) follows the same structure as the BigGAN 128×128 discriminator with the same simplifications done to the generator. The Swish non-linearity is used in all layers except for the output of the decoder, which uses a Tan h activation. To project the 2nd features produced by the encoder to a flat vector ($\mu$, $\log(\sigma^2)$), and to project the sampled codes z to a 2d space for the decoder, 3-layer multilayer perceptrons (MLPs) is used. For the face attribute classifiers, the same DenseNet architecture as described in Progressive Exaggeration is used.

All the models are optimized with Adam with a batch size of 256. During the training step, the auto-encoders are optimized for 400 epochs with a learning rate of $4.10^{-4}$. The classifiers are optimized for 100 epochs with a learning rate of $10^{-4}$. To prevent the auto-encoders from suffering KL vanishing, a cyclical annealing schedule on the third term of Equation 2 is adopted. At inference time, the perturbations are optimized with Adam until the black-box output for the generated explanation f($\tilde{x}$) only differs from the target output $\tilde{y}$, by a margin $\delta$ or when the maximum number of iterations $\tau$ is reached.

TABLE 2

FID of DiVE compared to xGEM, Progressive Exaggeration (PE), xGEM trained with the backbone (xGEM+), and DiVE trained without the perceptual loss (DiVE--)

| Target Attribute | xGEM | PE | xGEM+ | DiVE-- | DiVE |
|---|---|---|---|---|---|
| | | Smiling | | | |
| Present | 111.0 | 46.9 | 67.2 | 54.9 | 30.6 |
| Absent | 112.9 | 56.3 | 77.8 | 62.3 | 33.6 |
| Overall | 106.3 | 35.8 | 66.9 | 55.9 | 29.4 |

TABLE 2-continued

FID of DiVE compared to xGEM, Progressive Exaggeration (PE), xGEM trained with the backbone (xGEM+), and DiVE trained without the perceptual loss (DiVE--)

| Target Attribute | xGEM | PE | xGEM+ | DiVE-- | DiVE |
|---|---|---|---|---|---|
| | | Young | | | |
| Present | 115.2 | 67.6 | 68.3 | 57.2 | 31.8 |
| Absent | 170.3 | 74.4 | 76.1 | 51.1 | 45.7 |
| Overall | 117.9 | 53.4 | 59.5 | 47.7 | 33.8 |

TABLE 2

Bias detection experiment. For the targets "Smiling" and "Non-Smiling", explanations for a classifier biased on gender ($f_{biased}$) and an unbiased classifier ($u_{nbiased}$) are generated.

| | | Target label | | | | | |
|---|---|---|---|---|---|---|---|
| | | Smiling | | | Non-Smiling | | |
| black-box model | | PE | xGEM+ | DiVE | PE | xGEM+ | DiVE |
| $f_{biased}$ | Male | 0.52 | 0.06 | 0.11 | 0.18 | 0.77 | 0.84 |
| | Female | 0.48 | 0.94 | 0.89 | 0.82 | 0.24 | 0.16 |
| | Overall | 0.12 | 0.29 | 0.22 | 0.35 | 0.33 | 0.36 |
| | Oracle | | 0.75 | | | 0.67 | |
| $f_{un-biased}$ | Male | 0.48 | 0.41 | 0.42 | 0.47 | 0.38 | 0.44 |
| | Female | 0.52 | 0.59 | 0.58 | 0.53 | 0.62 | 0.57 |
| | Overall | 0.07 | 0.13 | 0.10 | 0.08 | 0.15 | 0.07 |
| | Oracle | | 0.04 | | | 0.00 | |

Counterfactual Explanation Quality

The quality of the counterfactual explanations is evaluated using FID scores as described in Singla. The scores are based on the target attributes "Smiling" and "Young", and are divided into three categories: Present, Absent, and Overall. Present considers explanations for which the black-box model outputs a probability greater than 0.9 for the target attribute. Absent refers to explanations for which the black-box model outputs a probability lower than 0.1 for the target attribute. Overall considers all the successful counterfactuals, which changed the original prediction of the black-box model.

These scores are reported in Table 2 for all three categories. DiVE produces the best quality counterfactuals, surpassing PE by 6.3 FID points for the "Smiling" target and 19.6 FID points for the "Young" target in the Overall category. DiVE obtains lower FID than xGEM+ which shows that the improvement not only comes from the superior architecture of the present method. Further, there are two other factors that explain the improvement of DiVE's FID. First, the β-TCVAE decomposition of the KL divergence improves the disentanglement ability of the model while suffering less reconstruction degradation than the VAE. Second, the perceptual loss makes the image quality constructed by DiVE to be comparable with that of the GAN used in PE.

Figure 6A:
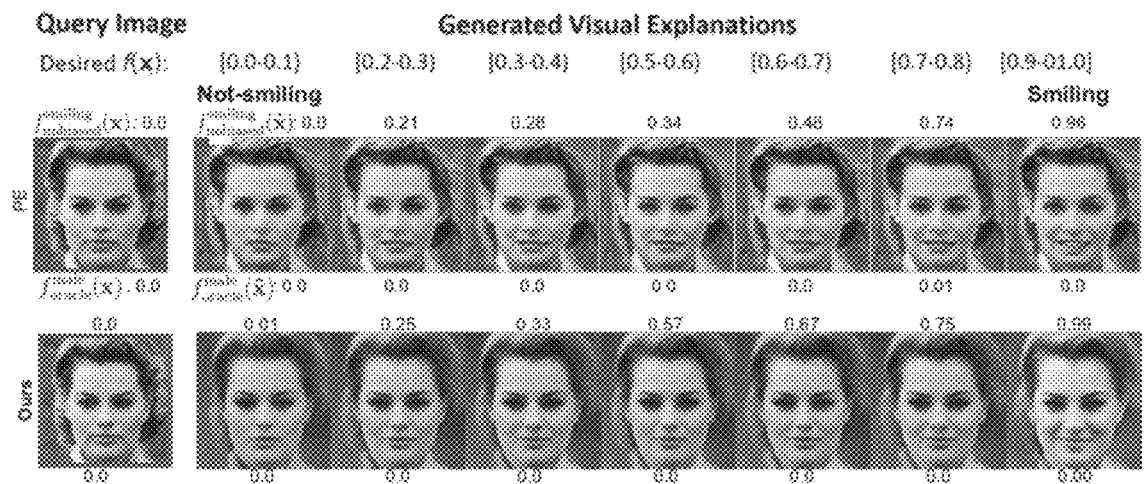
FIGS. 6a and 6b illustrate the results of a Bias Detection experiment. Each column presents an explanation for a target "Smiling" probability interval. Rows contain explanations produced by PE and DiVE.
Figure 7:
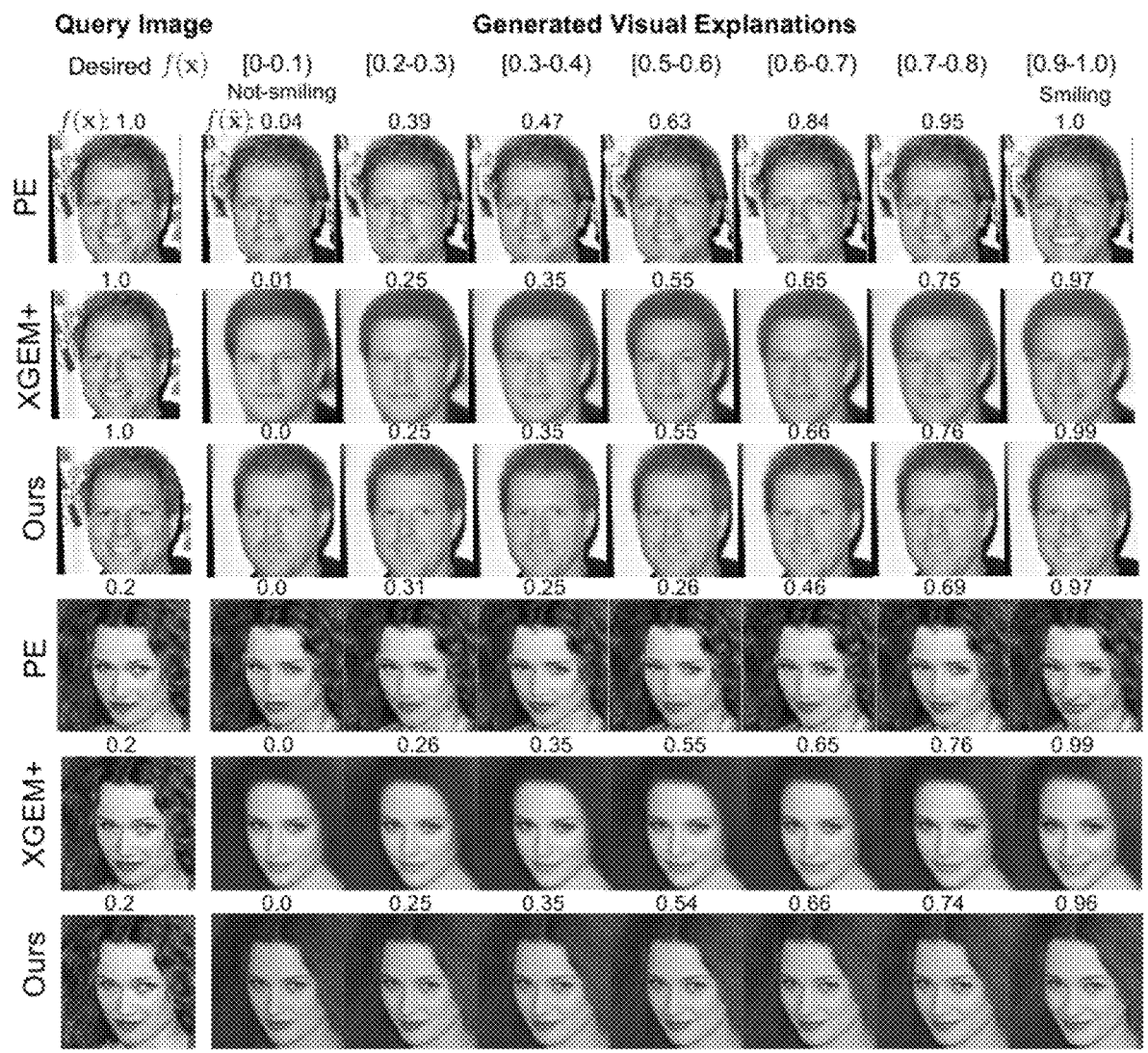
FIG. 7 illustrates the qualitative results of the method of FIG. 3, Progressive Exaggeration (PE), and xGEM for the "Smiling" attribute. Each column shows the explanations generated for a target probability output of the black-box model. The numbers on top of each row show the actual output of the black-box model.
Figure 8:
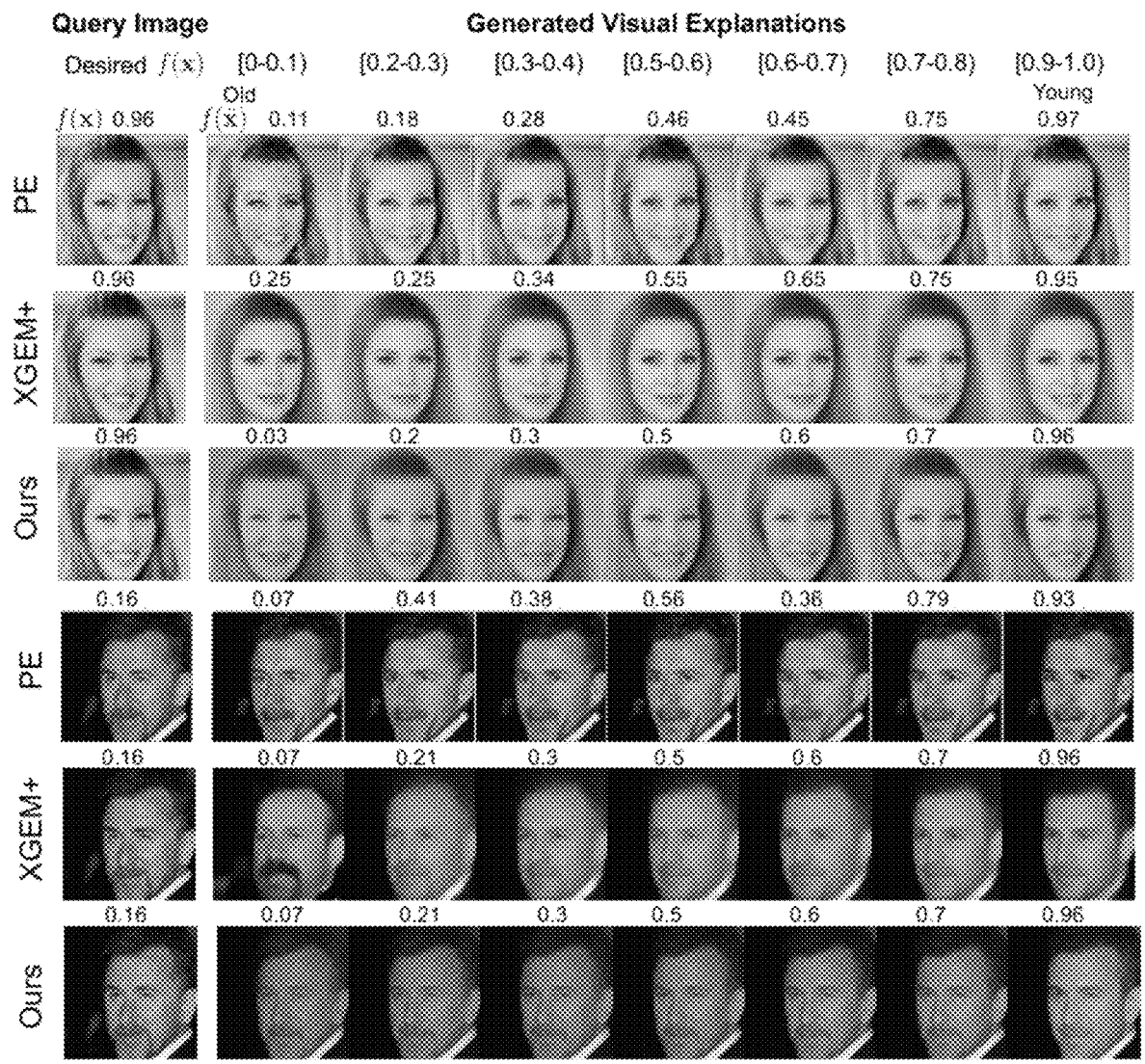
FIG. 8 illustrates qualitative results of the method of FIG. 3, Progressive Exaggeration (PE), and xGEM for the "Young" attribute. Each column shows the explanations generated for a target probability output of the black-box model. The numbers on top of each row show the actual output of the black-box model.

FIG. 6a illustrates qualitative results obtained by targeting different probability ranges for the output of the black-box model as described in PE. It should be noted that PE directly optimizes the generative model to take an input variable $\delta \in R$ that defines the desired output probability $\tilde{y}=f(x)+\delta$. To obtain explanations at different probability targets, a second order spline is trained on the trajectory of perturbations produced during the gradient descent steps of the present method. As shown in FIG. 6a, DiVE produces more natural-looking facial expressions than xGEM+ and PE. In FIG. 6a it can be seen that, even though DiVE is not explicitly trained to produce exemplars at intermediate target probabilities, explanations produced by the present method are more correlated with the target probabilities than PE. Additional results for "Smiling" and "Young" are provided in FIGS. 7 and 8 in the Appendix.

Bias Detection

DiVE's ability to detect biases in the data is evaluated in the following. The same procedure as PE is followed, and two binary classifiers for the attribute "Smiling" are trained. The first one is trained on a biased version of CelebA where all the male celebrities are smiling and all the female are not smiling ($f_{biased}$). The second one is trained on the unbiased version of the data ($f_{unbiased}$). Both classifiers are evaluated on the same validation set. Also following Singla, an oracle classifier $f_{oracle}$ based on VGGFace2 which obtains substantially perfect accuracy on the gender attribute is trained. The hypothesis is that if "Smiling" and gender are confounded by the classifier, so should be the explanations. Therefore, biases may be identified when the generated examples not only change the target attribute but also the confounded one.

In Table 3, the procedure presented in Singla is followed and the ratio of counterfactual explanations for "Smiling" that change the "Gender" attribute of the $f_{biased}$ and $f_{unbiased}$ classifiers is reported. To generate the counterfactuals, DiVE produces perturbations until it changes the original prediction of the classifier from, say, "Smiling" to "Non-Smiling". It can be noted that DiVE is more successful than PE at detecting biases although the generative model of DiVE was not trained with the biased data. While, in some cases, xGEM+ has a higher success rate at detecting biases, it produces lower-quality images that are far from the input. In fact, Table 4, which presents both metrics for DiVE and its baselines on the "Smiling" and "Young" classification tasks, shows that DiVE is more successful at preserving the identity of the faces than PE and xGEM. These results suggest that the combination of a disentangled latent features and the regularization of the latent features help DiVE to produce the minimal perturbations of the input that produce a successful counterfactual.

As argued, valuable explanations should remain proximal to the original image. Accordingly, performed the identity preservation experiment found in Singla to benchmark the methodologies against each other. Specifically, use the VGG-based oracle to extract latent codes for the original images as well as for the explanations and report latent space closeness as the fraction of time the explanations' latent codes are the closest to their respective original image latent codes' compared to the explanations on different original images. Further, we report face verification accuracy which consists of the fraction of time the cosine distance between the aforementioned latent codes is below 0.5.

$f_{biased}$ while for $f_{unbiased}$ it stays the same. In addition, it may also be observed that for $f_{biased}$ the correlation between "Smile" and "Gender" is higher than for PE. It can further be observed that xGEM+ fails to retain the identity of the person in x when compared to PE and the present method.

Beyond Trivial Explanations

Previous works on counterfactual generations tend to produce trivial input perturbations to change the output of a black-box model. That is, they tend to directly increase or decrease the presence of the attribute that the classifier has been trained to predict. For instance, in FIG. 6a all the explainers put a smile on the input face in order to increase the probability for "smile". While that is correct, this explanation does not provide any insight about the decisions of the black-box model. Thus, in the present description, emphasis is put on producing valuable or non-trivial explanations, that are different from the main attribute that the black-box model has been trained to identify. These kind of explanations provide more insight on what are the factors that affect the classifier and thus provide cues on how to improve the model or how to fix incorrect predictions.

Accordingly, a new benchmark that evaluates different methods' ability to generate valuable explanations is presented. That is, it is desired for the generated counterfactuals to 1) be misclassified by the black-box from a human perspective and 2) not have diverged too much from the original sample. A misclassification provides some insight into the weaknesses of the model. However, the counterfactual is more insightful when it stays close to the original image as it singles-out spurious correlations that the black-box model latched on. Because it is costly to provide human evaluation of an automatic benchmark, the proximity and the real class are approximated with the VGGFace2-based oracle. For 1), an explanation is successful if the black-box and the oracle do not agree on the counterfactual's target. As for 2), the proximity is approximated with the cosine distance between the sample and the counterfactual in the latent space of the oracle.

All methodologies introduced above are applied on a subset of the CelebA validation set.

The herein proposed experimental benchmark is performed on a subset of the validation set of CelebA. This subset is composed of four images for each CelebA attribute. From these four images, two images were correctly classified by the black-box model, while the other two images were misclassified. The two correctly classified images are chosen so that one was classified with a high confidence of 0.9 and the other one with low confidence of 0.1. The two misclassifications were chosen with the same criterion. For each of these images, k counterfactual explanations are generated. From these counterfactuals, the ratio of successful explanations is reported.

TABLE 4

Identity preserving performance on two prediction tasks.

| | CelebA: Smiling | | | | CelebA: Young | | | |
|---|---|---|---|---|---|---|---|---|
| | xGEM | PE | xGEM+ | DiVE (ours) | xGEM | PE | xGEM+ | DiVE (ours) |
| Latent Space Closeness | 88.2 | 88.0 | 99.8 | 98.7 | 89.5 | 81.6 | 97.5 | 99.1 |
| Face Verification Accuracy | 0.0 | 85.3 | 91.2 | 97.3 | 0.0 | 72.2 | 97.4 | 98.2 |

Figure 6B:
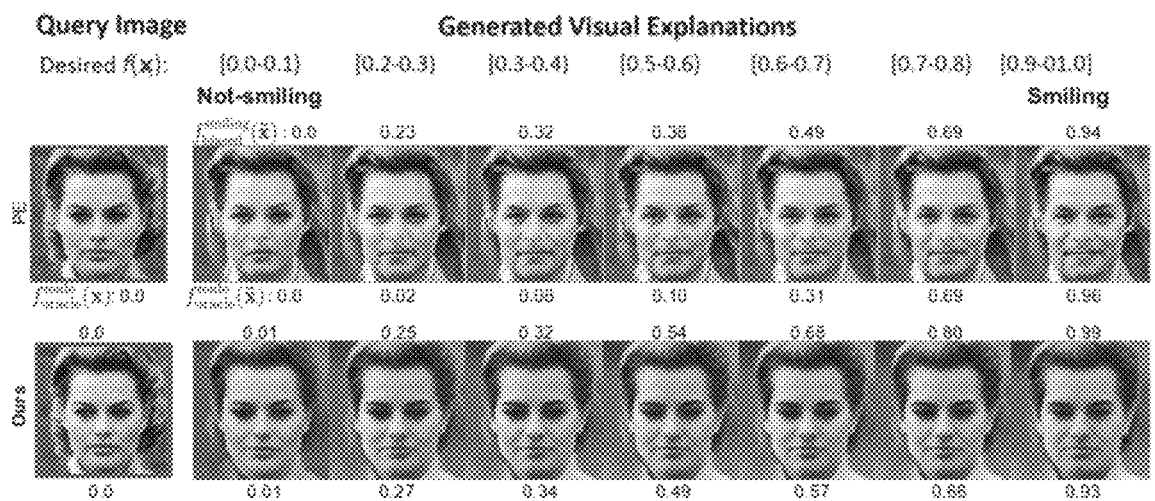
Figure 9A:
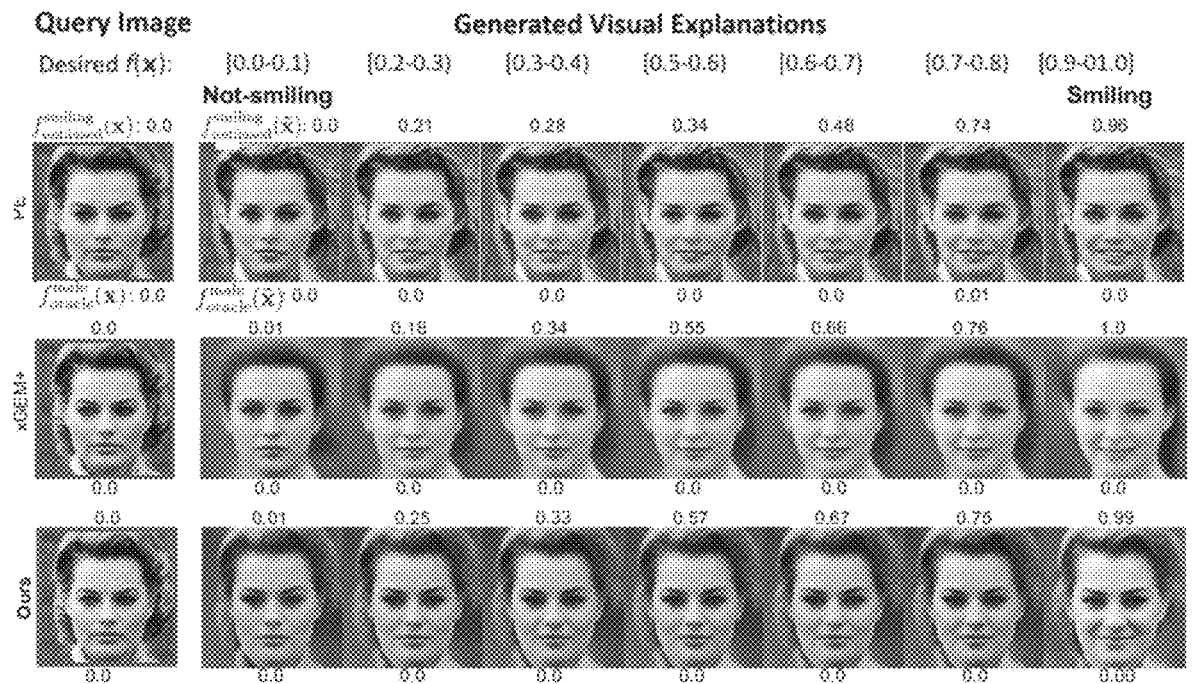
FIGS. 9a and 9b illustrate the results of an extended bias detection experiment. Each column presents an explanation for a target "Smiling" probability interval. Rows contain explanations produced by PE, xGEM+ and the present DiVE.
Figure 9B:
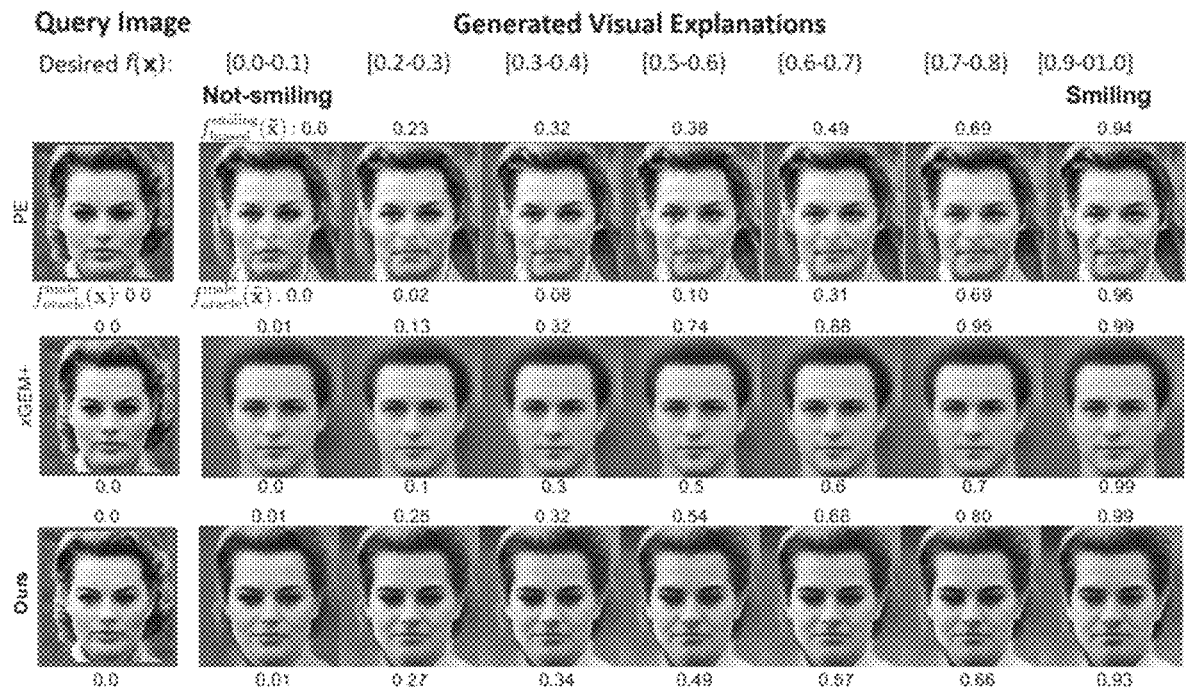
Figure 10A:
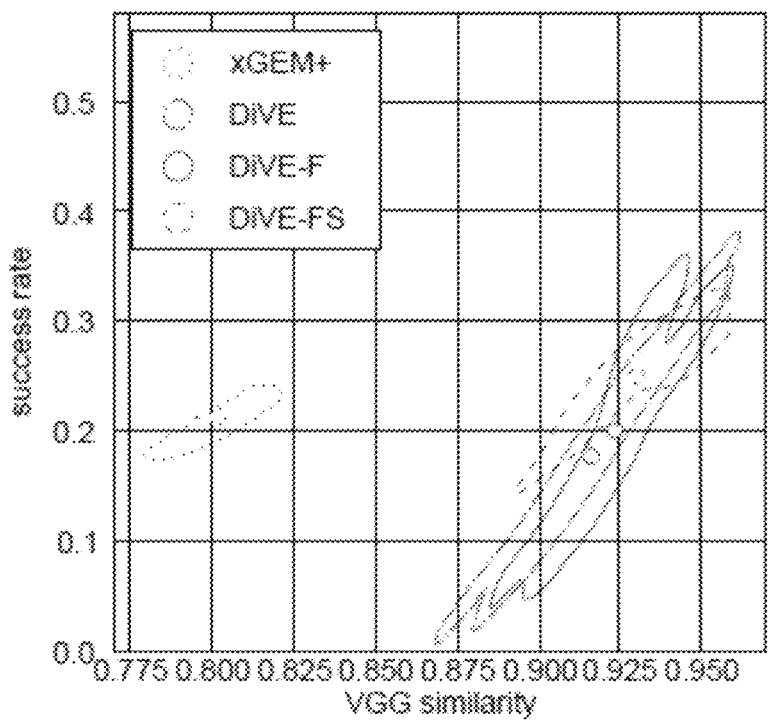
FIGS. 10a and 10b each illustrate the success rate (y-axis) plotted against VGG similarity (x-axis) for all methods. For both metrics, higher is better. The dot denotes the mean of the performances and the curves are compute with KDE. All DiVE methods outperform xGEM+ on both metrics simultaneously when conditioning on successful counterfactuals.
Figure 10B:
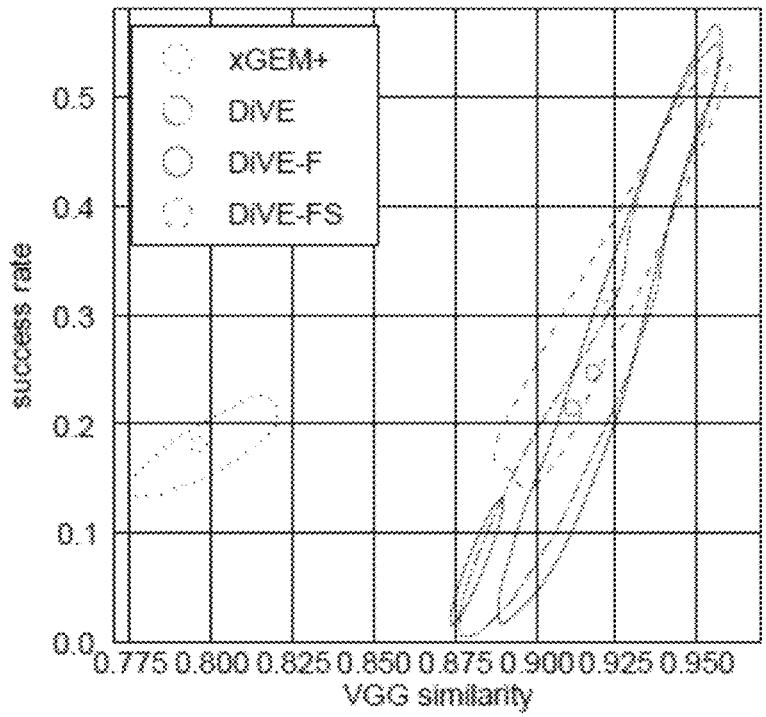

In FIG. 6b, samples generated by the present method with the two classifiers are provided and compared to PE, and the extension with xGEM+ is illustrated in FIG. 9. As it can be seen, the gender changes with the "Smiling" attribute with The results of the hyperparameter search are presented in FIGS. 10a and 10b. FIG. 10a shows results for all explanations and FIG. 10b shows only successful counterfactuals. Specifically, the dots denote the mean performances and the curves are computed with Kernel Density Estimation (KDE). On average, DiVE improves the similarity metric over xGEM+ highlighting the importance of disentangled representations for identity preservation. Moreover, using information from the Fisher Information Matrix further improves performance. Further, the proposed spectral clustering of the Fisher attains the best performance. Also, discarding non-conterfactuals improves the success rate.

As a result and in one embodiment, the present DiVE method uses a model that generates diverse valuable explanations of a model's decision. During training, the model optimizes an auto-encoder that learns a disentangled representation of the data. At test time, the model optimizes a perturbation vector of the latent representation in order to generate explanations. This optimization involves an adversarial loss, a diversity-enforcing loss and an adversarial regularization loss. Further, the model uses the Fisher Information Matrix to mask the most influential dimensions of the latent features to enforce the model to produce more valuable explanations that are beyond trivial. The above presented experiments show that previous methods are limited to single explanations whereas the present method can produce multiple, diverse explanations. The results also show that the present method achieves state-of-the-art results in terms of proximity and actionability on the CelebA dataset.

The embodiments of the invention described above are intended to be exemplary only. The scope of the invention is therefore intended to be limited solely by the scope of the appended claims.

We claim:

1. A computer-implemented method for explaining an image classifier, the method comprising:
 a) receiving an initial image, the initial image having been wrongly classified by the image classifier;
 b) receiving an initial gradient of a function executed by the image classifier generated while classifying the initial image, the function being indicative of a probability for the initial image to belong to an initial class;
 c) converting the initial image into a latent vector, the latent vector being a representation of the initial image in a latent space;
 d) generating a plurality of perturbation vectors using the initial gradient of the function executed by the image classifier;
 e) combining the latent vector with each one of the plurality of perturbation vectors, thereby obtaining a plurality of modified vectors;
 f) for each one of the plurality of modified vectors, reconstructing a respective image, thereby obtaining a plurality of reconstructed images;
 g) transmitting the reconstructed images to the image classifier;
 h) for each one of the plurality of reconstructed images, receiving a respective updated gradient of the function executed by the image classifier;
 i) using the respective updated gradients, determining amongst the reconstructed images at least one given reconstructed image for which the respective updated gradient is indicative that a new class different from the initial class has been assigned by the image classifier; and
 j) outputting the at least one given reconstructed image.

2. The computer-implemented method of claim 1, further comprising determining amongst the at least one given reconstructed image, at least one particular reconstructed image for which the corresponding latent vector introduces a minimal perturbation to the latent vector, said outputting the at least one given reconstructed image comprising outputting the at least one particular reconstructed image.

3. The computer-implemented method of claim 2, wherein said determining the at least one particular reconstructed image comprises for each one of the at least one given reconstructed image, repeating steps d)-h) while using the given reconstructed image as the initial image.

4. The computer-implemented method of claim 1, wherein said receiving the initial gradient comprises:
 converting the initial image into an initial latent vector;
 reconstructing an initial reconstructed image from the initial latent vector;
 transmitting the initial reconstructed image to the image classifier; and
 receiving the initial gradient from the image classifier.

5. A system for explaining an image classifier, the system comprising:
 a processor; and
 a non-transitory storage medium operatively connected to the processor, the non-transitory storage medium comprising computer readable instructions;
 the processor, upon executing the computer readable instructions, being configured for:
  a) receiving an initial image, the initial image having been wrongly classified by the image classifier;
  b) receiving an initial gradient of a function executed by the image classifier generated while classifying the initial image, the function being indicative of a probability for the initial image to belong to an initial class;
  c) converting the initial image into a latent vector, the latent vector being a representation of the initial image in a latent space;
  d) generating a plurality of perturbation vectors using the initial gradient of the function executed by the image classifier;
  e) combining the latent vector with each one of the plurality of perturbation vectors, thereby obtaining a plurality of modified vectors;
  f) for each one of the plurality of modified vectors, reconstructing a respective image, thereby obtaining a plurality of reconstructed images;
  g) transmitting the reconstructed images to the image classifier;
  h) for each one of the plurality of reconstructed images, receiving a respective updated gradient of the function executed by the image classifier;
  i) using the respective updated gradients, determining amongst the reconstructed images at least one given reconstructed image for which the respective updated gradient is indicative that a new class different from the initial class has been assigned by the image classifier; and
  j) outputting the at least one given reconstructed image.

6. The system of claim 5, wherein the processor is further configured for determining amongst the at least one given reconstructed image, at least one particular reconstructed image for which the corresponding latent vector introduces a minimal perturbation to the latent vector, said outputting the at least one given reconstructed image comprising outputting the at least one particular reconstructed image.

7. The system of claim 6, wherein in order to determine the at least one particular reconstructed image, the processor is configured to, for each one of the at least one given reconstructed image, repeat steps d)-h) while using the given reconstructed image as the initial image.

8. The system of claim 5, wherein the processor is further configured for:
  converting the initial image into an initial latent vector;
  reconstructing an initial reconstructed image from the initial latent vector;
  transmitting the initial reconstructed image to the image classifier; and
  receiving the initial gradient from the image classifier.

9. A system for explaining an image classifier, the system comprising:
  an encoder for:
    receiving an initial image, the initial image having been wrongly classified by the image classifier; and
    converting the initial image into a latent vector, the latent vector being a representation of the initial image in a latent space;
  a vector generator:
    receiving an initial gradient of a function executed by the image classifier generated while classifying the initial image, the function being indicative of a probability for the initial image to belong to an initial class;
    generating a plurality of perturbation vectors using the initial gradient of the function executed by the image classifier; and
    combining the latent vector with each one of the plurality of perturbation vectors, thereby obtaining a plurality of modified vectors; and
  a decoder for:
    for each one of the plurality of modified vectors, reconstructing a respective image, thereby obtaining a plurality of reconstructed images; and
    transmitting the reconstructed images to the image classifier,
  wherein the vector generator is further configured for:
    for each one of the plurality of reconstructed images, receiving a respective updated gradient of the function executed by the image classifier;
    using the respective updated gradients, determining amongst the reconstructed images at least one given reconstructed image for which the respective updated gradient is indicative that a new class different from the initial class has been assigned by the image classifier; and
    outputting an identification of the at least one given reconstructed image.

10. The system of claim 9, wherein the vector generator is further configured for determining amongst the at least one given reconstructed image, at least one particular reconstructed image for which the corresponding latent vector introduces a minimal perturbation to the latent vector, said outputting the identification of the at least one given reconstructed image comprising outputting an identification of the at least one particular reconstructed image.

11. The system of claim 9, wherein the encoder is further configured for converting the initial image into an initial latent vector, the decoder is further configured for reconstructing an initial reconstructed image from the initial latent vector and transmitting the initial reconstructed image to the image classifier, and the vector generator is configured for receiving the initial gradient from the image classifier.

12. The system of claim 9, wherein the encoder comprises a first neural network executing a first machine learning algorithm and the decoder comprises a second neural network executing a second machine learning algorithm.

13. The system of claim 12, wherein the first and second neural networks are identical.

14. The system of claim 12, wherein the first and second neural networks are trained using a same set of data.

15. The system of claim 14, wherein the same set of data corresponds to a given set of data used for training the image classifier.

* * * * *